US008743894B2

(12) United States Patent
Fomin et al.

(10) Patent No.: US 8,743,894 B2
(45) Date of Patent: *Jun. 3, 2014

(54) BRIDGE PORT BETWEEN HARDWARE LAN AND VIRTUAL SWITCH

(71) Applicant: International Business Machines Corporation, Armonk, NY (US)

(72) Inventors: Waleri Fomin, Schoenaich (DE); Angelo Macchiano, Apalachin, NY (US); Richard P. Tarcza, Kingston, NY (US); Alexandra Winter, Schwieberdingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,556

(22) Filed: Oct. 30, 2012

(65) Prior Publication Data

US 2013/0051400 A1 Feb. 28, 2013

Related U.S. Application Data

(63) Continuation of application No. 13/159,592, filed on Jun. 14, 2011, now abandoned.

(51) Int. Cl.
*H04L 12/56* (2011.01)
*H04L 12/28* (2006.01)

(52) U.S. Cl.
USPC ........... 370/402; 370/392; 709/222; 709/227; 709/228

(58) Field of Classification Search
USPC .......... 370/392; 709/222–228; 718/1; 726/11
See application file for complete search history.

(56) References Cited

U.S. PATENT DOCUMENTS

| 7,580,347 | B2 | 8/2009 | Geile et al. | |
|---|---|---|---|---|
| 7,639,605 | B2 | 12/2009 | Narayanan et al. | |
| 2004/0062272 | A1* | 4/2004 | Greco et al. | 370/466 |
| 2004/0068589 | A1* | 4/2004 | Witkowski et al. | 709/249 |
| 2007/0036178 | A1 | 2/2007 | Hares et al. | |
| 2007/0076719 | A1* | 4/2007 | Allan et al. | 370/392 |
| 2009/0016365 | A1 | 1/2009 | Sajassi et al. | |
| 2009/0138638 | A1* | 5/2009 | Russo et al. | 710/106 |
| 2009/0249471 | A1* | 10/2009 | Litvin et al. | 726/13 |
| 2010/0080238 | A1 | 4/2010 | Allan et al. | |
| 2011/0019654 | A1 | 1/2011 | Harmatos et al. | |
| 2011/0270953 | A1* | 11/2011 | Levine et al. | 709/218 |
| 2011/0289204 | A1* | 11/2011 | Hansson et al. | 709/224 |

* cited by examiner

*Primary Examiner* — Andrew Chriss
*Assistant Examiner* — Romani Ohri
(74) *Attorney, Agent, or Firm* — Cantor Colburn LLP; Dennis Jung

(57) ABSTRACT

A method of operating a computer system comprising a bridge port between a hardware local area network (LAN) and a virtual switch includes providing a first hash table by the hardware LAN to the virtual switch via the bridge port, wherein the first hash table comprises addresses of a first plurality of VMs that comprise the hardware LAN, wherein the first plurality of VMs communicate with the hardware LAN via respective hardware network interface cards (NICs); and updating a second hash table in the virtual switch to include the addresses of the first hash table, wherein the second hash table further comprises addresses of a second plurality of VMs of the virtual switch, wherein the second plurality of VMs communicate with the virtual switch via respective virtual NICs.

21 Claims, 6 Drawing Sheets

BRIDGE PORT BETWEEN HARDWARE LAN AND VIRTUAL SWITCH

CROSS-REFERENCES TO RELATED APPLICATIONS

This application is a continuation of U.S. application Ser. No. 13/159,592 filed on Jun. 14, 2011, which is herein incorporated by reference in its entirety.

BACKGROUND

This disclosure relates generally to the field of computer systems, and more particularly to a computer system that includes a hardware local area network (LAN) and a virtual switch.

A LAN is a computer network that connects computers and devices in a limited geographical area, for example, a home, school, computer laboratory or office building. LANs are often privately owned and located within a single building or site. A LAN may connect personal computers of a company to permit them to share resources such as printers and databases, and to exchange information. A LAN may also be connected to other networks, such as a wide area network (WAN), to enable communication between computers on the different networks. An application running on a computer on a LAN is able to communicate over the LAN with applications on other computers on the LAN, and with computers on external networks using a communications protocol such as transmission control protocol/internet protocol (TCP/IP).

Typically, a LAN may comprise several layers of software and hardware, and a tangible communication medium such as copper wires or fiber optic cables. The communications software and hardware may be embodied in a network interface card (NIC). A physical layer of the LAN is responsible for transmitting data bits over a communication medium. A data link layer organizes the data bits into frames, transmits the frames in proper order, recognizes the beginning and end of a frame, and processes acknowledgements. A network layer determines the routing of the frames from source computer to a destination computer. A session layer creates sessions between different computers to allow transfer data. A transport layer accepts data from a session, divides it into packets, passes these packets to the network layer, and verifies that the packets are received at the destination. A presentation layer is responsible for ensuring proper syntax and semantics of the frames which are transmitted. An application layer is responsible for supporting various data transfer protocols. A LAN may connect many different physical computers, or may be implemented within a single computer, or mainframe.

A simulated LAN may be run internally on a computer system or mainframe. A simulated LAN comprises a plurality of virtual machines (VMs) connected by a virtual switch. The VMs of the simulated LAN communicate with the virtual switch via virtual NICs. Each VM appears to the user to as a personal operating system. Many applications may run on each VM in the simulated LAN. Applications running on the different VMs may communicate with each other via the virtual switch, and may also communicate with other computers on an external LAN that is bridged to the virtual switch via an external uplink port of the virtual switch.

A computer system that includes one or more virtual switches may also include an internal hardware LAN. A hardware LAN also includes multiple VMs; however, the VMs of the hardware LAN communicate with the hardware LAN via dedicated physical hardware NICs. A hardware LAN may be implemented in firmware of the computer system. Hardware LAN VMs may be appropriate for users that require enhanced access to the resources of the computer system that may not be available through VMs that communicate with the computer system via a virtual switch and a virtual NIC.

BRIEF SUMMARY

In one aspect, a method of operating a computer system comprising a bridge port between a hardware local area network (LAN) and a virtual switch includes providing a first hash table by the hardware LAN to the virtual switch via the bridge port, wherein the first hash table comprises addresses of a first plurality of VMs that comprise the hardware LAN, wherein the first plurality of VMs communicate with the hardware LAN via respective hardware network interface cards (NICs); and updating a second hash table in the virtual switch to include the addresses of the first hash table, wherein the second hash table further comprises addresses of a second plurality of VMs of the virtual switch, wherein the second plurality of VMs communicate with the virtual switch via respective virtual NICs.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a bridge port between a hardware LAN and a virtual switch, and a method of operating a bridge port between a hardware LAN and a virtual switch, are provided, with exemplary embodiments being discussed below in detail. The bridge port enables communication between the hardware LAN and the virtual switch. Traffic originating in the hardware LAN for destinations located outside of the hardware LAN may be sent automatically via the bridge port to the virtual switch for resolution. Therefore, the VMs on the hardware LAN may communicate with the VMs of the virtual switch, and with computers on an external LAN connected to the virtual switch, using the bridge port. The bridge port provides low-latency connectivity between VMs on the hardware LAN and the VMs on the virtual switch. Because a single external connection is provided from the bridged VMs on the hardware LAN and virtual switch to the external network via an external uplink port of the virtual switch, the amount of memory needed to manage the external connection is reduced. If the virtual switch becomes unavailable, transparent failover by the hardware LAN to a standby bridge port on a standby virtual switch may be automatically performed to maintain connectivity from the hardware LAN to the external LAN.

Figure 1:
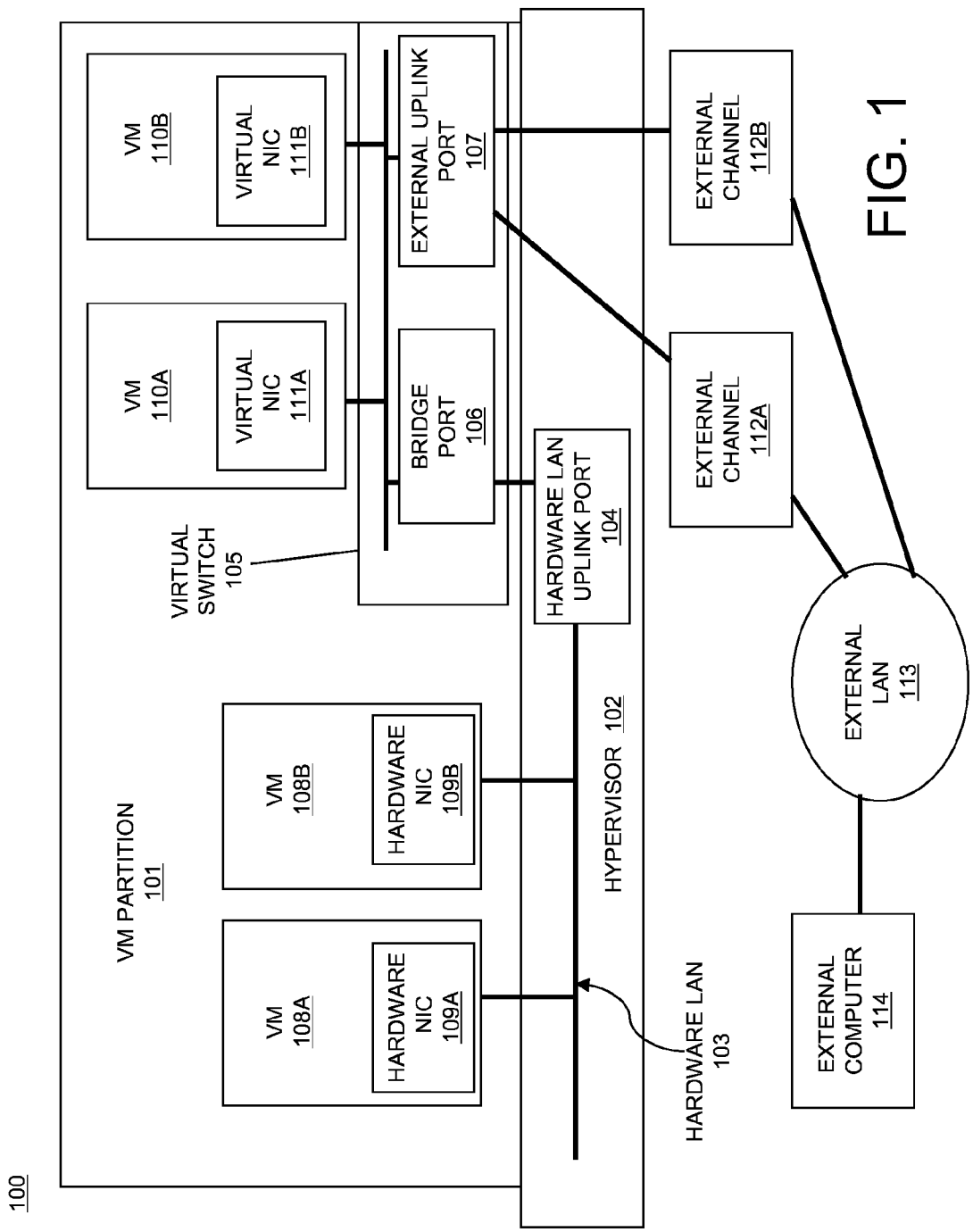
FIG. 1 illustrates a block diagram of an embodiment of a computer system including a bridge port between a hardware LAN and a virtual switch.

FIG. 1 illustrates a block diagram of an embodiment of a computer system 100 including a bridge port 106 between a hardware LAN 103 and a virtual switch 105. The hardware LAN 103 and the virtual switch 105 are run inside a VM partition 101 of the computer system 100. The VM partition 101 is managed by a hypervisor 102 of the computer system 100. Computer system 100 may include a plurality of additional partitions that are managed by hypervisor 102 in some embodiments. The hardware LAN 103 of computer system 100 includes VMs 108A-B with respective physical hardware NICs 109A-B. The hardware LAN 103 is implemented in firmware of the computer system 100, and the hardware NICs 109A-B on the hardware LAN 103 may run a synchronous communications protocol such as internal Queued Direct Input/Output (iQDIO). The hardware LAN 103 is connected to virtual switch 105 via hardware LAN uplink port 104 and bridge port 106. The virtual switch 105 supports VMs 110A-B, with respective virtual NICs 111A-B. The virtual NICs 111A-B and the virtual switch 105 may communicate via an asynchronous communication protocol such as Queued Direct Input/Output (QDIO). The aggregate connection of the virtual NICs 111A-B via virtual switch 105 make up a single layer 2 Ethernet broadcast domain simulated LAN. The virtual switch 105 also has an external uplink port 107. Virtual switch 105 uses the external uplink port 107 to merge its simulated LAN (including VMs 110A-B and virtual NICs 111A-B) to an external LAN, such as external LAN 113, via one or more external channels such as external channels 112A-B. The virtual switch 105 provides Ethernet connectivity between the VMs 110A-B, and between VMs 110A-B and external computers, such as external computer 114, on the external LAN 113.

The bridge port 106 connects the VMs 110A-B on the virtual switch 105 with the VMs 108A-B on the hardware LAN 103, merging the hardware LAN 103 into the layer 2 Ethernet broadcast domain simulated LAN of the virtual switch 105. The bridge port 106 allows VMs 110A-B and VMs 108A-B to communicate directly with each other. The bridge port also allows the VMs 110A-B to communicate with destinations on an external LAN 113 such as external computer 114 thorough the external uplink port 107 of virtual switch 105. The bridge port 106 converts the synchronous protocol (e.g., iQDIO) run by the hardware NICs 109A-B to an asynchronous protocol (e.g., QDIO) for communication with the virtual NICs 111A-B on the virtual switch 105. The bridge port 106 allows for two physical networks (i.e., the hardware LAN 103 and the external LAN 113) to be bridged concurrently to the virtual switch 105, forming a single Ethernet layer 2 network comprising of the two physical networks and the virtual switch 105. A TCP/IP stack establishing a network connection anywhere on this bridged network can communicate freely with all the other active ports connected to the virtual switch 105, hardware LAN 103, and the external LAN 113.

The virtual switch 105 maintains a hash table containing media access control (MAC) addresses of the VMs 110A-B supported by the virtual switch 105. A hash table entry contains a pointer to a control block structure created and managed by virtual switch 105 which represents a QDIO connection for VMs 110A-B. These control block structures contain additional information such as assigned VLAN IDs associated with the network connection for the VMs 110A-B. Traffic in virtual switch 105 that has a destination MAC address that is not listed in the hash table of virtual switch 105 is automatically sent to the external uplink port 107 for resolution by one of external channels 112A-B. Any packet received by the virtual switch 105 having a destination MAC address that is not resident in the local hash table of the virtual switch 105 is sent to the external LAN 113 via external uplink port 107 for resolution. This allows a packet originating from a virtual NIC 111A-B on the virtual switch 105 to reach a port on external LAN 113. The hardware LAN 103 also maintains a hash table containing MAC addresses of the VMs 108A-B on the hardware LAN 103. Traffic in the hardware LAN 103 (i.e., traffic originating from VMs 108A-B) having a destination MAC address that is not listed in the hash table of hardware LAN 103 is automatically sent to the virtual switch 105 for resolution, via hardware LAN uplink port 104 and bridge port 106. In order to handle traffic with destination MAC addresses and VLAN (Virtual LAN) on the hardware LAN 103, the virtual switch 105 requires knowledge of the hash table of hardware LAN 103. Therefore, when the bridge port 106 is established, virtual switch 105 issues a machine instruction to hypervisor 102 that causes the hardware LAN 103 to provide its hash table, which includes the MAC addresses, VLAN(s) and a network token representing the hardware NICs 109A-B of VMs 108A-B, to the virtual switch 105. An example of such a hash table entry is discussed below with respect to FIG. 4. If there is a change to the hash table of the hardware LAN 103, the change is communicated to the virtual switch 105 and the hash table of virtual switch 105 is updated accordingly. Updating the hash table of the virtual switch 105 with changes to the hash table of hardware LAN 103 may be performed asynchronously.

Figure 2:
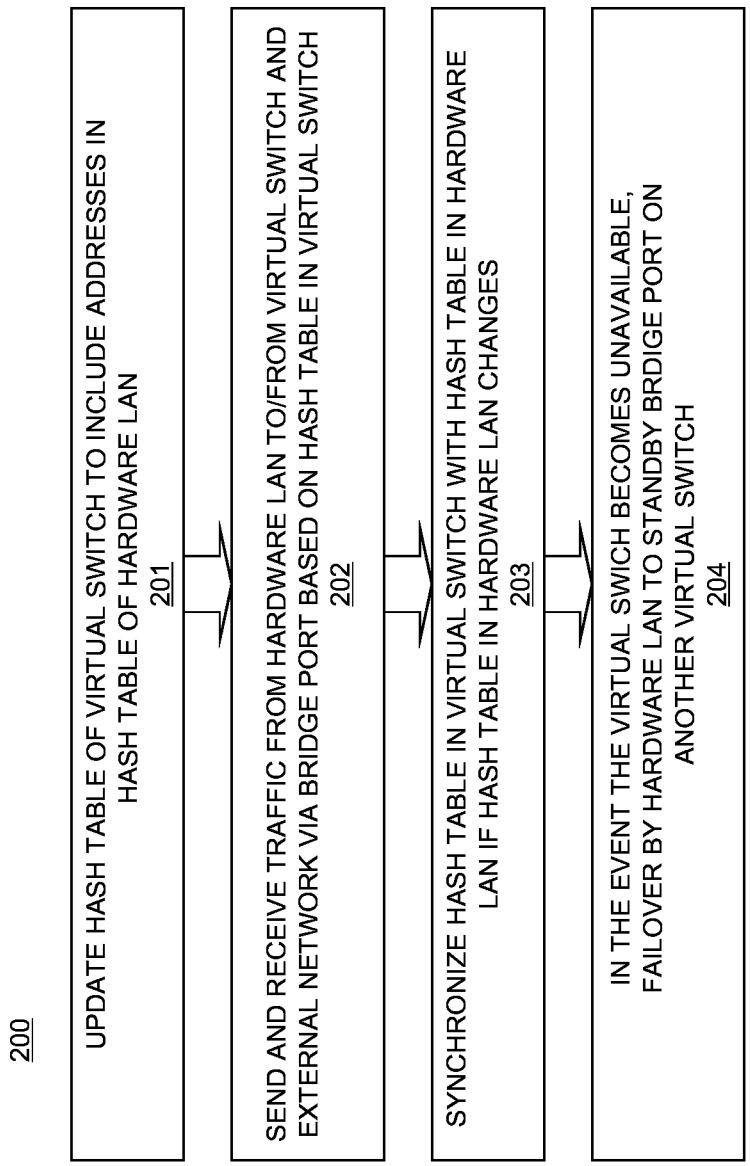
FIG. 2 illustrates a flowchart of an embodiment of a method of operating a computer system including a bridge port between a hardware LAN and a virtual switch.

FIG. 2 illustrates a flowchart of an embodiment of a method 200 of operating a computer system including a bridge port between a hardware LAN and a virtual switch. FIG. 2 is discussed with respect to FIG. 1. In block 201, the virtual switch 105 receives the hash table of the hardware LAN 103, and the virtual switch 105 updates its hash table to include the MAC addresses from the hash table of the hardware LAN. In the embodiment of a computer system 100 of FIG. 1, the hash table of virtual switch 105 would therefore include the MAC addresses and VLAN(s) of both VMs 108A-B and VMs 110A-B. An example of such a hash table entry is discussed below with respect to FIG. 4. In block 202, normal operation commences, and traffic from the hardware LAN 103 having a destination that is not listed in the hash table of the hardware LAN 103 is sent via hardware LAN uplink port 104 and bridge port 106 to virtual switch 105 for resolution. Traffic received by the virtual switch 105 (i.e., from hardware LAN 103 or from VMs 110A-B) having a destination address that is not listed in the hash table of the virtual switch 105 is sent to the external uplink port 107 for resolution by external LAN 113. Traffic destined for the hardware LAN 103 may also be received from the external LAN 113 by the virtual switch 105, and routed to the hardware LAN 103 via the bridge port 106 based on the MAC addresses in the hash table in the virtual switch 105. In block 203, if there is a change to the hash table of the hardware LAN 103, the change is communicated to the virtual switch 105, and the virtual switch 105 updates its hash table accordingly. In some embodiments, the change may be communicated asynchronously by sending an I/O interrupt from hardware LAN 103 to the virtual switch 105, prompting the virtual switch 105 to read the hash table of hardware LAN 103 and update the hash table in virtual switch 105. In block 204, if the virtual switch 105 becomes unavailable, the hardware LAN 103 may automatically connect via the hardware LAN uplink port 104 to a standby bridge port a standby virtual switch on the computer system, allowing the hardware LAN 103 to continue communication with external destinations. The standby virtual switch may be located in the same partition as the hardware LAN in some embodiments, or in a different partition in other embodiments. This is discussed in further detail below with respect to FIG. 5.

Figure 3:
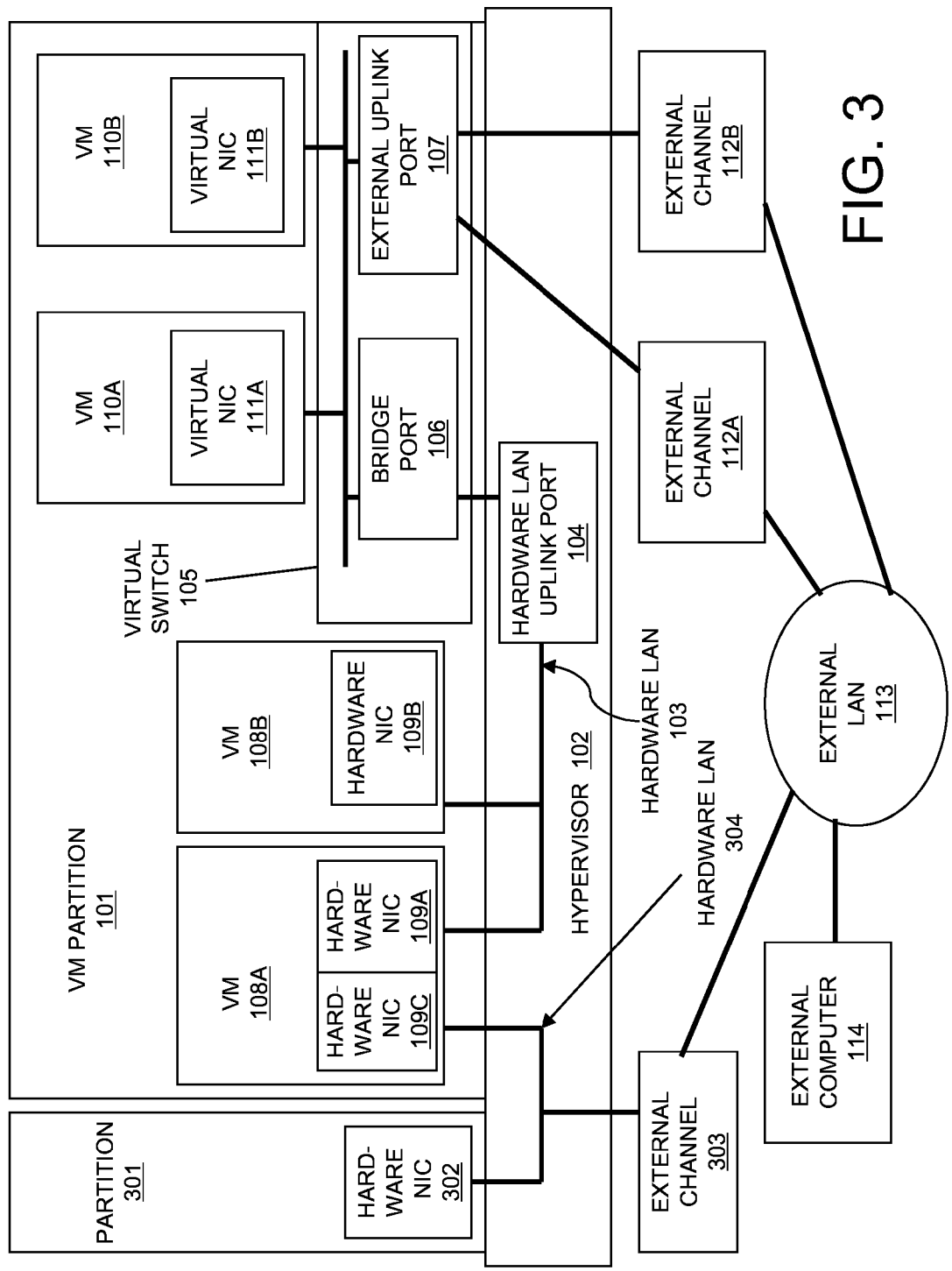
FIG. 3 illustrates a block diagram of an embodiment of the computer system of FIG. 1 with an additional partition.

FIG. 3 illustrates a block diagram of an embodiment of a computer system 300 with an additional partition 301. The VM partition 101 and the additional partition 301 are managed by the hypervisor 102. Partition 301 on hardware LAN 304 is connected to external LAN 113 via hardware NIC 302 and external channel 303. VM 108A on hardware LAN 304 is connected to the external LAN 113 via hardware NIC 109C and external channel 303, and not does not communicate with the hardware LAN uplink port 104. VM 108A establishes a connection to the hardware LAN 103 on hardware NIC 109A but has opted out of the virtual switch 105 bridge function provided by bridge port 106. VM 108A is able to communicate directly to VM 108B through hardware NIC 109A on hardware LAN 103, but uses hardware NIC 109C to communicate with the external LAN 113, and with VMs 110A-B on virtual switch 105. VM 108B on the hardware LAN 103 is connected to external LAN 113 via bridge port 106 and virtual switch 105. In various embodiments, any VM on a hardware LAN may opt to communicate with an external network via a bridge port and virtual switch, or via a different connection that is available on the computer system on which the hardware LAN resides. This allows different interface merging technologies to coexist on the hardware LAN 103. In such an embodiment, the hash table of the virtual switch does not list the MAC address of any VM on the hardware LAN that is not in communication with the virtual switch via the bridge port.

Figure 4:
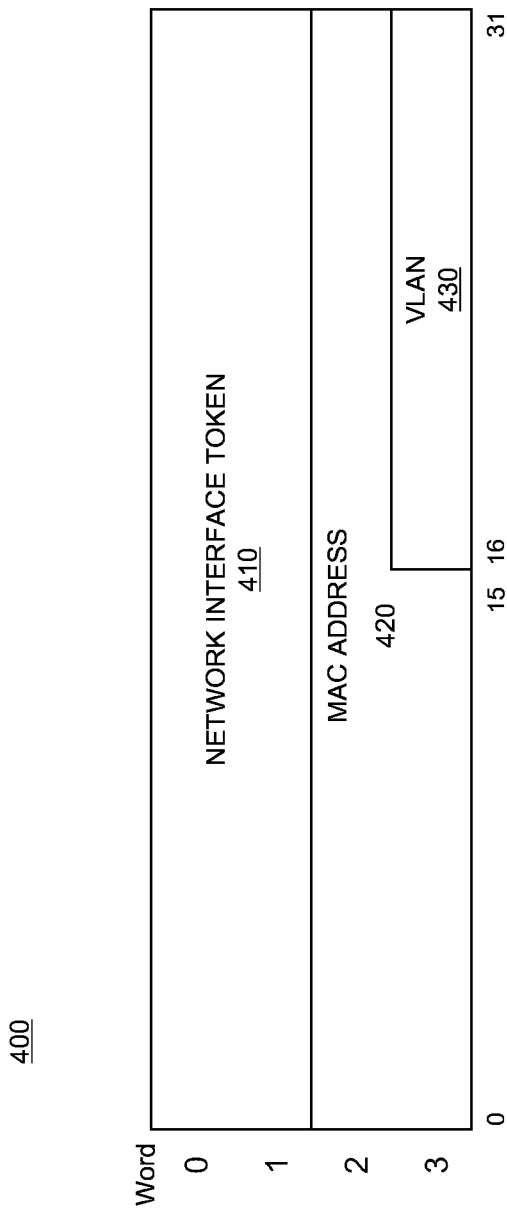
FIG. 4 illustrates an example of a structure of a single hash table entry in an array that is returned to a virtual switch by a hypervisor.

FIG. 4 illustrates an example of the structure of a single hash table entry 400 corresponding to a hardware NIC of a VM on the hardware LAN 103 in an array that is returned to virtual switch 105 by hypervisor 102. Virtual switch 105 maintains the VLANs for VMs 108A-B of the hardware LAN 103 in an extension of its existing control block structure used for VMs 110A-B. This extension of the control block structure provides the capability for virtual switch 105 to view VMs 108A-B as local VMs. Hardware generates a unique network token to identify each of hardware NICs 109A-B. The MAC address 420 and VLAN 430 that are returned are associated with the network token 410.

Figure 5:
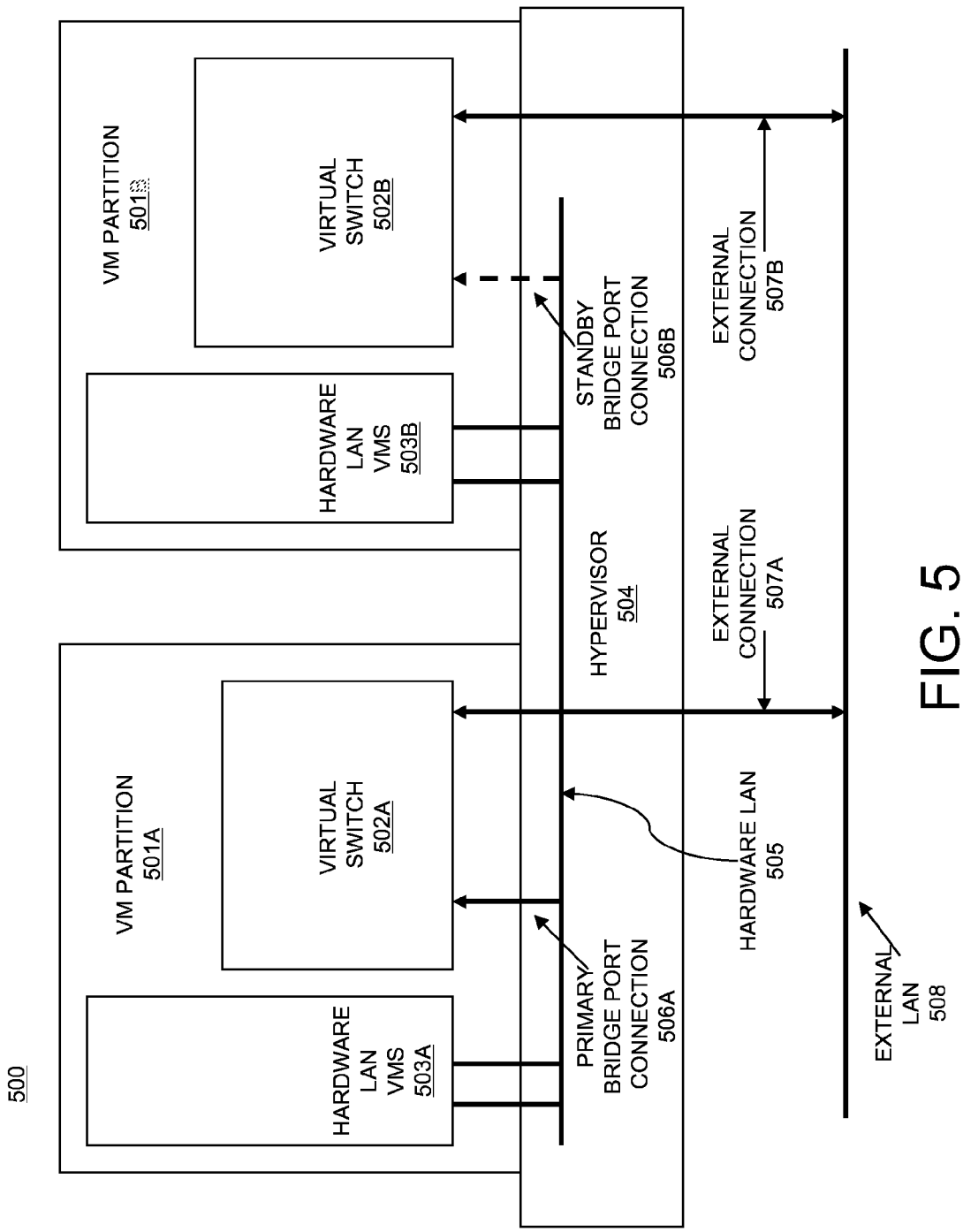
FIG. 5 illustrates a block diagram of an embodiment of a computer system with primary and standby bridge port connections.

FIG. 5 illustrates a block diagram of an embodiment of a computer system 500 with two VM partitions 501A-B. The computer system 500 includes a primary bridge port connection 506A to a first virtual switch 502A, and a standby bridge port connection 506B to a second virtual switch 502B that may be used for failover as is performed in block 204 of method 200 of FIG. 2. The computer system of FIG. 5 includes two VM partitions 501A-B, with respective virtual switches 502A-B and hardware LAN VMs 503A-B, which are connected to the hardware LAN 505 via respective hardware NICs (not shown). Each virtual switch 502A-B has a respective external connection 507A-B to external LAN 508. Virtual switch 502A is acting as the primary virtual switch in the embodiment shown in FIG. 5, such that hardware LAN VMs 503A-B all communicate with external LAN 508 via the primary bridge port connection 506A and external connection 507A. In the event that virtual switch 502A becomes unavailable, hardware LAN VMs 503A-B and hardware LAN 505 may failover to standby bridge port connection 506B and communicate with external LAN 508 via virtual switch 502B and external connection 507B. To provide predictability in selecting which virtual switch primarily provides the bridge port function, there are two types of bridge port connections that may be established by a virtual switch, primary and standby. Establishing a primary bridge port type connection will automatically take over the bridge function from another virtual switch that has established its bridge port as a standby type connection. Therefore, a virtual switch with a standby type bridge port connection will remain in standby unless the primary virtual switch bridge port connection is not functional.

Broadcast rules may be put in place to prevent inadvertent broadcast processing or broadcast storms for a computer system that incorporate a bridge port between a hardware LAN and a virtual switch. A broadcast message may be processed differently based on the type of port that originated the broadcast message. For a broadcast message originated by a VM on the virtual switch, a broadcast/multicast frame is processed by the virtual switch on the transmitting VM's output queue. For a broadcast message originated by the virtual switch's external uplink port or bridge port, the broadcast/multicast frame is processed by the virtual switch on its input queue. Broadcast echoing, i.e. reflection of a broadcast back on the originating port, may not be not supported. The virtual switch sends a clone of a received broadcast frame on all ports except for the one on which the broadcast frame was received. The virtual switch will forward a broadcast/multicast frame it receives on its external uplink port to all VMs on the virtual switch and to the bridge port. Likewise, a broadcast received from the bridge port will be sent to all VMs on the virtual switch and to the external uplink port. The virtual switch has no knowledge of link connections on the hardware LAN; it only has knowledge of the bridge port, which it treats as a special type of guest port. A multicast MAC address must be in the virtual switch hash table before any frames containing a multicast destination MAC address are sent to the bridge port. This filters unnecessary multicast traffic from being sent to the bridge port for it to process.

A broadcast frame received by the hardware LAN is processed by firmware on the multicast queue of the port on which the broadcast frame was received. A broadcast/multicast frame originating from the virtual switch and sent to the bridge port to the hardware LAN is sent by firmware to only VMs on the hardware LAN that communicate with the bridge port (such VMs referred to hereinafter as bridged ports). VMs on the hardware LAN that opt out of bridge port communications (as was discussed above with respect to FIG. 3, referred to hereinafter as a non-bridged port) or converged QDIO link ports rely on their respective external connections for broadcasts. A broadcast/multicast frame originating from a non-bridged port or converged QDIO link port on the hardware LAN is sent to all active ports on the hardware LAN, but not to the hardware LAN uplink port. Sending a broadcast to both non-bridged ports and bridged ports allows a non-bridged port to directly communicate with bridged ports on the hardware LAN segment using the synchronous protocol of the hardware LAN, rather then having to go through the bridge port. The same holds true for allowing bridged port to talk directly to a non-bridged ports using the synchronous protocol of the hardware LAN. Address resolution broadcasts and neighbor discovery multicast from a VM may be sent to both the bridge port and a port used for opt-out external communications to resolve the optimum location for future unicast communications with the target host; all non-address resolution broadcast and multicast may only be sent on the port used for opt-out external communications to avoid duplicate frame presentation to the bridged ports.

FIGS. 1, 3, and 5 are shown for illustrative purposes only. Any appropriate number of VMs with respective hardware NICs may be supported by a hardware LAN, and any appropriate number of VMs with respective virtual NICs may be supported by a virtual switch. Any VM may run any appropriate operating system, including but not limited to Windows or Linux. A computer system such as computer systems 100, 300, or 500 may also be any appropriate type of computer system, such as a mainframe, with any appropriate number of partitions running any appropriate type of operating system. Further, a bridge port may bridge a hardware LAN and a virtual switch that are located in the same partition of a computer system, or in different partitions of the computer system. Any appropriate number of external computers and additional networks may be connected to an external LAN. In some embodiments, the hardware LAN may be an internal hardware LAN such as HiperSockets, the virtual switch may be a z/VM Vswitch, and the hypervisor may be a PR/ZM hypervisor (HiperSockets, z/VM, and PR/ZM are registered trademarks of International Business Machines Corporation).

Figure 6:
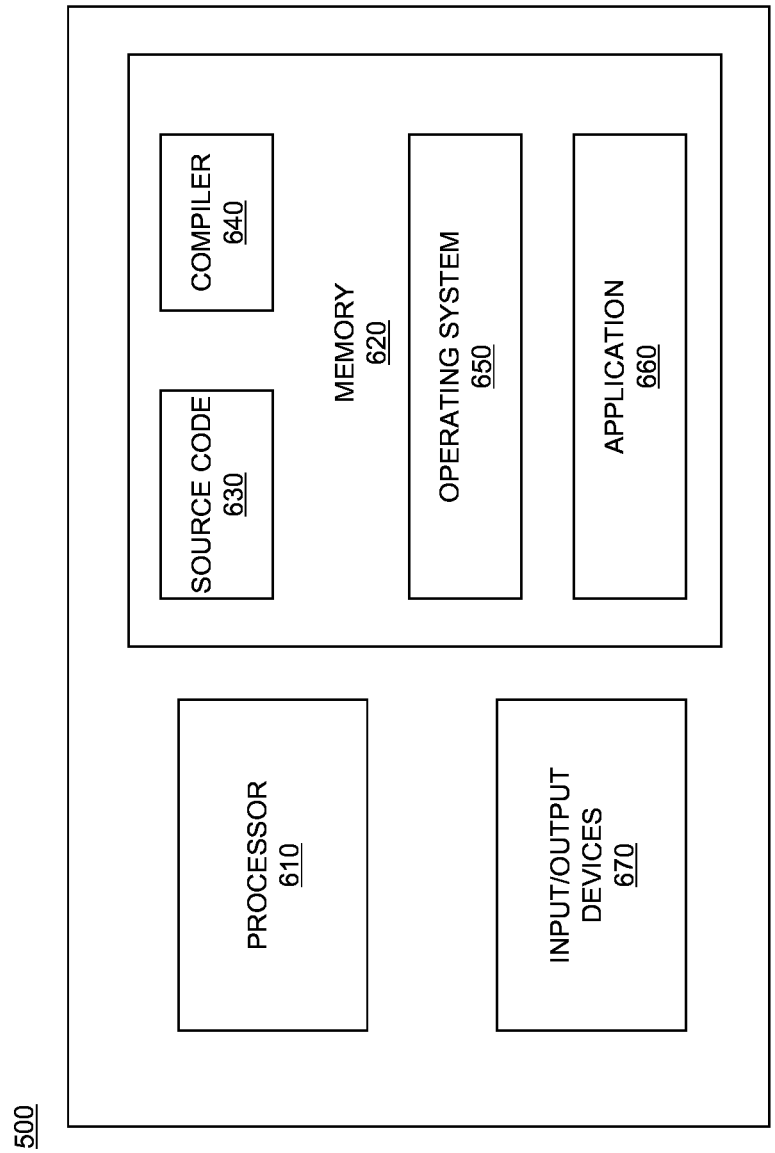
FIG. 6 illustrates a block diagram of an embodiment of a computer that may be used in conjunction with a bridge port between a hardware LAN and a virtual switch.

FIG. 6 illustrates an example of a computer 600 which may be utilized by exemplary embodiments of a bridge port between a hardware LAN and a virtual switch. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include bridging a hardware LAN and a virtual switch to provide a single simulated LAN, and enabling communications from the simulated LAN including the hardware LAN and the virtual switch to an external LAN via a single external connection.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of operating a computer system comprising a bridge port between a hardware local area network (LAN) and a virtual switch, the method comprising:
   providing a first hash table by the hardware LAN to the virtual switch via the bridge port, wherein the first hash table comprises addresses of a first plurality of VMs that comprise the hardware LAN, wherein the first plurality of VMs communicate with the hardware LAN via respective hardware network interface cards (NICs);
   updating a second hash table in the virtual switch to include the addresses of the first hash table, wherein the second hash table further comprises addresses of a second plurality of VMs of the virtual switch, wherein the second plurality of VMs communicate with the virtual switch via respective virtual NICs; and
   sending traffic originating from one of the first plurality of VMs having a destination address that is not in the first hash table from the hardware LAN to the virtual switch via the bridge port.

2. The method of claim 1, further comprising based on there being a change in the first hash table in the hardware LAN, updating the second hash table in the virtual switch to reflect the change via the bridge port.

3. The method of claim 1, further comprising sending traffic originating from one of the first plurality of VMs having a destination address that is not in the second hash table by the virtual switch to an external LAN.

4. The method of claim 1, further comprising sending traffic originating from one of the second plurality of VMs or the external LAN having a destination address that is in the first hash table by the virtual switch to the hardware LAN via the bridge port.

5. The method of claim 1, wherein the hardware LAN further comprises a hardware LAN uplink port connected to the bridge port, and further comprising sending traffic originating from one of the first plurality of VMs having a destination address that is not in the first hash table from the hardware LAN to the virtual switch via the bridge port and the hardware LAN uplink port.

6. The method of claim 1, wherein the virtual switch further comprises an external uplink port connected to the external LAN, and further comprising sending the traffic originating from one of the first plurality of VMs having a destination address that is not in the second hash table from the virtual switch to the external LAN via the external uplink port.

7. The method of claim 1, wherein the virtual switch is configured to send traffic originating from one of the second plurality of VMs or the external LAN having a destination address that is in the first hash table to the hardware LAN via the bridge port.

8. The method of claim 1, further comprising a standby virtual switch, the standby virtual switch comprising a standby bridge port.

9. The method of claim 1, wherein the plurality of hardware NICs communicate with the hardware LAN using a synchronous protocol, wherein the plurality of virtual NICs communicate with the virtual switch using an asynchronous protocol, and wherein the bridge port is configured to convert between the synchronous protocol and the asynchronous protocol.

10. A computer system, comprising:
a bridge port located between a hardware local area network (LAN) and a virtual switch;
the hardware LAN, the hardware LAN comprising a first plurality of virtual machines (VMs), wherein the first plurality of VMs communicate with the hardware LAN via respective hardware network interface cards (NICs);
the virtual switch, the virtual switch comprising a second plurality of VMs, wherein the second plurality of VMs communicate with the virtual switch via respective virtual NICs, wherein the first plurality of VMs communicate with the second plurality of VMs via the bridge port; and
wherein the hardware LAN comprises a first hash table, the first hash table comprising addresses of the first plurality of VMs, and wherein the hardware LAN is configured to send traffic originating from one of the first plurality of VMs having a destination address that is not in the first hash table to the virtual switch via the bridge port.

11. The computer system of claim 10, wherein the hardware LAN further comprises a hardware LAN uplink port connected to the bridge port, and wherein the hardware LAN is configured to send the traffic originating from one of the first plurality of VMs having a destination address that is not in the first hash table to the virtual switch via the bridge port and the hardware LAN uplink port.

12. The computer system of claim 10, wherein the virtual switch comprises a second hash table, the second hash table comprising addresses of the first plurality of VMs and the second plurality of VMs.

13. The computer system of claim 12, wherein the virtual switch is configured to send traffic originating from one of the first plurality of VMs having a destination address that is not in the second hash table to an external LAN.

14. The computer system of claim 13, wherein the virtual switch further comprises an external uplink port connected to the external LAN, and wherein the virtual switch is configured to send the traffic originating from one of the first plurality of VMs having a destination address that is not in the second hash table to the external LAN via the external uplink port.

15. The computer system of claim 12, wherein the virtual switch is configured to send traffic originating from one of the second plurality of VMs or the external LAN having a destination address that is in the first hash table to the hardware LAN via the bridge port.

16. The computer system of claim 10, wherein the hardware LAN further comprises at least one additional VM, the at least one additional VM comprising an at least one additional respective hardware NIC, that is connected to an external LAN by a connection that does not comprise the bridge port and the virtual switch.

17. The computer system of claim 10, further comprising a standby virtual switch, the standby virtual switch comprising a standby bridge port.

18. The computer system of claim 10, wherein the plurality of hardware NICs communicate with the hardware LAN using a synchronous protocol, wherein the plurality of virtual NICs communicate with the virtual switch using an asynchronous protocol, and wherein the bridge port is configured to convert between the synchronous protocol and the asynchronous protocol.

19. A computer program product comprising a non-transitory computer readable storage medium containing computer code that, when executed by a computer, implements a method of operating a computer system comprising a bridge port between a hardware local area network (LAN) and a virtual switch, wherein the method comprises:
providing a first hash table by the hardware LAN to the virtual switch via the bridge port, wherein the first hash table comprises addresses of a first plurality of VMs that comprise the hardware LAN, wherein the first plurality of VMs communicate with the hardware LAN via respective hardware network interface cards (NICs);
updating a second hash table in the virtual switch to include the addresses of the first hash table, wherein the second hash table further comprises addresses of a second plurality of VMs of the virtual switch, wherein the second plurality of VMs communicate with the virtual switch via respective virtual NICs; and
sending traffic originating from one of the first plurality of VMs having a destination address that is not in the first hash table from the hardware LAN to the virtual switch via the bridge port.

20. The computer program product according to claim 19, further comprising based on there being a change in the first hash table in the hardware LAN, updating the second hash table in the virtual switch to reflect the change via the bridge port.

21. The computer program product according to claim 19, further comprising sending traffic originating from one of the first plurality of VMs having a destination address that is not in the second hash table from the virtual switch to an external LAN.

* * * * *